UNITED STATES PATENT OFFICE.

JOHN REICHEL, OF PHILADELPHIA, PENNSYLVANIA, ASSIGNOR TO H. K. MULFORD COMPANY, OF PHILADELPHIA, PENNSYLVANIA.

PROCESS OF PRODUCING REFINED HOG-CHOLERA SERUM.

1,335,986.   Specification of Letters Patent.   Patented Apr. 6, 1920.

No Drawing.   Application filed April 3, 1914.   Serial No. 829,176.

*To all whom it may concern:*

Be it known that I, JOHN REICHEL, a citizen of the United States, residing in Philadelphia, Pennsylvania, have discovered a certain new and useful Process of Producing Refined Hog-Cholera Serum, of which the following is a specification.

This discovery relates to a new and useful process of eliminating living or dead germs, cellular debris, fibrin, serum albumin from hog cholera antitoxin in the form of serum or defibrinated blood by the use of chemical precipitants other than those producing insoluble hydroxids, and has for an object to obtain an improved hog cholera antitoxin containing the hog cholera immune or anti-bodies, and the hog cholera globulin with which hogs may be immunized against hog cholera, and hogs sick with hog cholera may be cured.

In carrying out the process of the discovery hog cholera antitoxin may be used in the form of serum or defibrinated blood, either fresh, sterile, preserved or otherwise, and therefor the process in practice is not to be considered as restricted to any particular prepared form of hog cholera antitoxin. Injections of virulent blood or virus, from a hog sick of hog cholera or the cause of hog cholera, into an animal immune from hog cholera from any cause, produces in the blood of that immune animal an antitoxin or hog cholera immune bodies which may be obtained or drawn off in the form of a serum or defibrinated blood containing many substances aside from the purely watery portion, such as globulins, serum albumins, cellular debris, fibrin, living or dead germs and salts, among which the hog cholera immune bodies are included as a part or are closely associated therewith.

It is to the antitoxin obtained in this or other ways that this process relates more particularly, and the process is carried out by the following treatment steps in order to remove the living or dead germs, cellular debris, fibrin, serum albumin, and recover the hog cholera immune or antitoxin bodies along with the globulins or hog cholera serum globulin. The process consists primarily of breaking up the serum into a number of fractions, in each of which there is contained some of the desired hog cholera immune bodies and globulins, and these may be separated or recovered from either fraction to obtain the hog cholera serum globulin in solution or powder, rich or poor in hog cholera immune bodies according to the fraction treated provided the several fractions contain different percentages of the immune bodies and globulins, which latter condition has been found by experimentation as the more general one.

The process is preferably carried out by taking a definite amount of hog cholera antitoxin, serum or defibrinated blood, as above described, and treating it with a chemical precipitant, other than those forming insoluble hydroxids, such as ammonia sulfate in solution or in crystalline form so that the resulting mixture contains approximately $33\frac{1}{3}\%$ of the chemical. The reaction taking place throws down a precipitate, termed for convenience the A fraction, containing cellular debris, fibrin, some hog cholera immune bodies and globulins (pseudo-globulins and euglobulins), which is then filtered and removed from the solution and soluble contents.

The filtrate resulting from this step is a solution comparatively rich in hog cholera immune bodies and psuedo globulins, and may be termed for convenience the B fraction, which is preferably treated separate from the A fraction to obtain its active constituents. This is accomplished by bringing the filtrate or B fraction up to a higher saturation of the chemical, in this instance ammonia sulfate, giving substantially a 50% solution of the chemical. The precipitate from this solution contains a large percentage of the hog cholera immune bodies and psuedo-golbulins. This B fraction precipitate is filtered and may then be quickly washed, dried, powdered, dissolved in a diluent or dialyzed, ready for use. The chemical reagents used in the process may be removed partially or entirely from the B fraction precipitate by absorption or dialyses, and the hog cholera immune bodies and globulins, partially or entirely in solution, may then be preserved by filtration or addition of a preservative.

Returning, now, to the A fraction precipitate, the hog cholera immune bodies and globulins contained therein may be separated from the inactive substances by macerating the entire fraction in water and the removal of the insoluble cellular debris, fibrin and killed germs by filtration. By the addition of a chemical precipitant, preferably sodium chlorid, until the filtrate is saturated with the chemical, the euglobulins are precipitated and may be removed by filtration, while the hog cholera immune bodies and psuedo-globulins in the saturated sodium chlorid filtrate are then precipitated by the addition of a suitable chemical precipitant, such as glacial acetic acid and the precipitate removed by filtration.

The resultant globulin precipitates from the respective fractions A and B may be added one to the other, or each may be used alone in the preparation of hog cholera antitoxin from which the living and dead germs, cellular debris, fibrin and serum albumin have been eliminated and in connection with injections of hog cholera virus or the cause of hog cholera to prevent the disease known as hog cholera in healthy hogs, and to cure hogs sick of hog cholera.

While the process above described is made up of a number of steps and in eliminating living or dead germs, cellular debris, fibrin, serum albumin from hog cholera antitoxin and for specifically recovering from hog cholera antitoxin, the hog cholera immune bodies and globulins or active substances of the A and B fractions, it is to be understood that the process is not to be limited to the specific number of steps described, since broadly considered the process is adequately embodied in those steps constituting the recovery of the active substances, hog cholera immune bodies and globulins or hog cholera serum globulin from the B fraction, and obviously the process in its specific details may consist of substantially an indefinite number of fractional recoveries of the active substances, and therefore the scope of the process is not restricted in any manner to the specific details here recited.

Attention is particularly directed to the fact that the chemical precipitants used are not such as to form insoluble hydroxids, and while mention is made of ammonia sulfate, sodium chlorid and glacial acetic acid, it is not to be understood that the new process is limited to the use of these chemicals since they have been mentioned only by way of example and as one means of carrying out the process. Furthermore it will be noted that the fractional precipitation of the hog cholera immune bodies and globulins or active substances from the hog cholera antitoxin, either fresh, sterile, preserved or otherwise, by which the latter is freed from living or dead germs, cellular debris, fibrin, or serum albumin, is accomplished without the use of heat.

The nature of the resultant hog cholera serum obtained by the process of this discovery may be more readily understood and its advantages appreciated when it is stated that the ordinary commercial hog cholera antitoxin supplied and used in the present day practice is a comparatively heavy turbid liquid of reddish hue containing in addition to the active substances, serum albumin, cellular debris, fibrin, living or dead germs, some of which are even perceptible to the eye in the product as ordinarily prepared. When this commercial hog cholera antitoxin is introduced or injected into a hog suffering from hog cholera or into a healthy cholera-free hog to prevent the development of hog cholera, it frequently occurs that the germs introduced along with the active substances offset whatever beneficial effect is anticipated by the active substances.

A still further disadvantage inherent in the ordinary hog cholera antitoxin resides in the difficulty with which absorption occurs when injected into an animal under treatment. It is a frequent occurrence when injecting a hog with hog cholera antitoxin, to subsequently find the unabsorbed portion of the antitoxin at or near the point of injection in the form of a cold encapsulated or active abscess, all of which more or less limits the possible value of the hog cholera antitoxin.

By the present process hog cholera serum globulin, an entirely new substance as far as I am aware, may be obtained, and is available as a clear, substantially transparent solution, entirely free of living or dead germs, cellular debris, fibrin or other inert substances and also lacking in the presence of the serum albumin.

It will now be apparent that the process embodies the features of advantage enumerated as desirable in the statement of the discovery and in the above description, and while in the present instance the preferred embodiment has been described, which gives satisfactory and reliable results, it is to be understood that the same is susceptible of modification in various particulars without departing from the spirit or scope of the discovery or sacrificing any of its advantages.

Having thus described my invention, what I claim and desire to protect by Letters Patent is:

1. The process of eliminating from hog cholera "antitoxin," the serum albumins, cellular debris, fibrin, or living or dead germs, by precipitation with chemical precipitants other than those forming insoluble hydroxids and filtration and preserving only the active substances, whereby the hog cholera immune bodies and the globulins are obtained having the characteristics of increasing the resistance of the hog against infection from hog cholera virus or the cause of hog cholera, and adapted to be used either alone or in connection with hog cholera virus or the cause of hog cholera to prevent the disease known as hog cholera in healthy hogs or to cure hogs sick of hog cholera.

2. The process of eliminating from hog cholera "antitoxin" all living or dead germs, cellular debris, fibrin, or serum albumin by treating the hog cholera antitoxin or serum with chemical precipitants other than those forming insoluble hydroxids and preserving only the active substances, whereby the hog cholera immune bodies and the globulins are obtained having the characteristics of increasing the resistance of the hog against infection from hog cholera virus or the cause of hog cholera, and adapted to be used either alone or in connection with hog cholera virus or the cause of hog cholera to prevent the disease known as hog cholera in healthy hogs or to cure hogs sick of hog cholera.

3. In the process of producing hog cholera globulin from hog cholera "antitoxin," defibrinated blood or serum, the step which consists, in treating it with ammonia sulfate, so that the resulting mixture contains approximately thirty-three and a third per cent. of the chemical and filtering the mixture.

4. In the process of producing hog cholera globulin from hog cholera "antitoxin," defibrinated blood or serum, the steps which consist, in treating it with ammonia sulfate, so that the resulting mixture contains approximately thirty-three and one third per cent. of the chemical, obtaining a filtrate from the mixture, treating the filtrate with ammonia sulfate, so that the resulting mixture contains substantially a fifty per cent. solution of the chemical, and filtering the precipitate.

5. The process of producing hog cholera globulin from hog cholera "antitoxin," defibrinated blood or serum, the steps which consist, in treating it with ammonia sulfate, so that the resulting mixture contains approximately thirty-three and a third per cent. of the chemical, obtaining a filtrate from the mixture, treating the filtrate with ammonia sulfate, so that the resulting mixture contains substantially a fifty per cent. solution of the chemical, and filtering the precipitate, and partially or entirely removing from the precipitate the chemicals used in the said steps.

6. The process of producing hog cholera immune bodies and globulin from hog cholera "antitoxin," defibrinated blood or serum, the steps which consist, in treating it with ammonia sulfate, so that the resulting mixture contains approximately thirty-three and a third per cent. of the chemical, obtaining a filtrate from the mixture, treating the filtrate with ammonia sulfate, so that the resulting mixture contains substantially a fifty per cent. solution of the chemical, and filtering the precipitate, and partially or entirely removing from the precipitate the chemicals used, and then preserving the hog cholera immune bodies and globulins by filtration or the addition of a preservative.

7. The process of producing hog cholera globulin from hog cholera "antitoxin," defibrinated blood or serum, the step which consists, in treating it with ammonia sulfate, so that the resulting mixture contains approximately thirty-three and a third per cent. of the chemical, obtaining a precipitate from the mixture, macerating the precipitate in water, removing therefrom by filtration the insoluble cellular debris, fibrin and killed germs, adding sodium chlorid to the filtrate, until the filtrate is saturated with the chemical, removing the precipitate therefrom, adding to the precipitate glacial acetic acid, and removing the precipitate by filtration.

8. The process of producing hog cholera globulin, which consists in mixing hog cholera "antitoxin," defibrinated blood or serum with ammonia sulfate, so that the resulting mixture contains approximately thirty-three and one third per cent. of the chemical, obtaining from the mixture a filtrate, treating the filtrate with ammonia sulfate, so that the resulting mixture contains substantially a fifty per cent. solution of the chemical, and filtering, and washing, drying, powdering, dissolving in a diluent or dialyzing the precipitate ready for use.

9. A new substance, concentrated hog cholera antitoxin, derived from the blood of immune hogs, from which the serum-albumin, cellular elements, and other inert substances present in such blood have in large part been removed, and containing the globulins and anti-bodies of such blood, and having the characteristics of immunizing hogs against infection from hog cholera and curing those artificially infected with hog cholera, and adapted to be used either alone or in connection with injections of the virus of hog cholera, to prevent the disease known as "hog cholera" in healthy hogs, and to cure hogs sick of hog cholera.

10. A substance produced from hog cholera defibrinated blood antitoxin, by treating the same with a chemical precipitant and filtering, the filtrate possessing the active substance thereof, to prevent the disease known as hog cholera in healthy hogs, and to cure hogs sick of hog cholera, and having the characteristics of being practically freed of living or dead germs, cellular debris or fibrin.

11. A substance produced from hog cholera defibrinated blood antitoxin and possessing the active substances thereof, to prevent the disease known as hog cholera in healthy hogs, and to cure hogs sick of hog cholera, and having the characteristics of being in a concentrated form, and practically freed of living or dead germs, cellular debris, fibrin or serum albumin.

12. A new substance, concentrated hog cholera antitoxin, consisting of the plasma, or defibrinated blood of immune hogs hyperimmunized by injection of hog cholera virus, from which the serum-albumin, cellular elements, and other inert substances present in such plasma or defibrinated blood have in large part been removed, and containing, in a concentrated or refined state, the globulins and anti-bodies of such plasma or defibrinated blood, and having the characteristics of immunizing hogs against infection from hog cholera and curing those artificially infected with hog cholera, and adapted to be used either alone or in connection with injections of the virus of hog cholera, to prevent the disease known as hog cholera in healthy hogs, and to cure hogs sick of hog cholera.

13. A substance produced from hog-cholera defibrinated blood antitoxin and possessing the active substances thereof, and having the characteristics of being in a sterile form, and freed of living or dead germs, cellular debris, fibrin or serum albumin, the same being held in solution or suspension or being in solid form as a powder capable of solution or suspension.

14. A substance produced from and possessing the active substances of hog-cholera defibrinated blood antitoxin to prevent the disease known as hog cholera in healthy hogs, and to cure hogs sick of hog cholera, and having the characteristics of being in a concentrated and sterile form, and freed of living or dead germs, cellular debris, fibrin or serum albumin.

15. A new substance produced from hog-cholera defibrinated blood antitoxin, consisting of the hog-cholera immune bodies and the globulins, having the characteristics of being in sterile and concentrated form, and increasing the resistance of the hog against infection from hog cholera virus or the cause of hog cholera and adapted to be used either alone or in connection with hog cholera virus or the cause of hog cholera to prevent the disease known as hog cholera in healthy hogs and to cure hogs sick of hog cholera.

16. A new substance produced from hog-cholera defibrinated blood antitoxin, consisting of the hog-cholera immune bodies and the globulins, having the characteristics of being in sterile and concentrated form, and held in solution of suspension or being in solid form as a powder capable of solution or suspension, and of increasing the resistance of the hog against infection from hog cholera virus or the cause of hog cholera and adapted to be used either alone or in connection with hog cholera virus or the cause of hog cholera to prevent the disease known as hog cholera in healthy hogs and to cure hogs sick of hog cholera.

17. A new substance made from hog cholera defibrinated blood antitoxin and consisting of the hog cholera globulins, and possessing the characteristics of being in sterile form, and increasing the resistance of the hog against infection from hog cholera virus or the cause of hog cholera and adapted to be used either alone or in connection with hog cholera virus or the cause of hog cholera to prevent the disease known as hog cholera in healthy hogs, and to cure hogs sick of hog cholera.

18. A new substance made from hog cholera defibrinated blood antitoxin, consisting of the hog cholera pseudo-globulins, and practically freed from living or dead germs, cellular debris, fibrin, or serum albumin, possessing the characteristics of increasing the resistance of the hog against infection from hog cholera virus or the cause of hog cholera and adapted to be used either alone or in connection with hog cholera virus or the cause of hog cholera to prevent the disease known as hog cholera in healthy hogs, and to cure hogs sick of hog cholera.

19. As a new substance hog cholera globulin, consisting only of the hog cholera immune bodies and the globulins obtained from hog cholera defibrinated blood antitoxin, having the active substances in concentrated and sterile form.

20. A substance produced from hog cholera defibrinated blood antitoxin, and possessing the active substances thereof, and having the characteristics of being in a sterile form, and freed of living or dead germs, cellular debris, fibrin or serum albumin.

In testimony that I claim the foregoing as my discovery, I have hereunto signed my name this second day of April, 1914.

JOHN REICHEL.

In the presence of—
 HORACE D. REEVE,
 ROBERT M. BARR.